June 15, 1965  R. W. MIECZKOWSKI  3,188,937
AIR CONTROL APPARATUS
Filed March 13, 1963
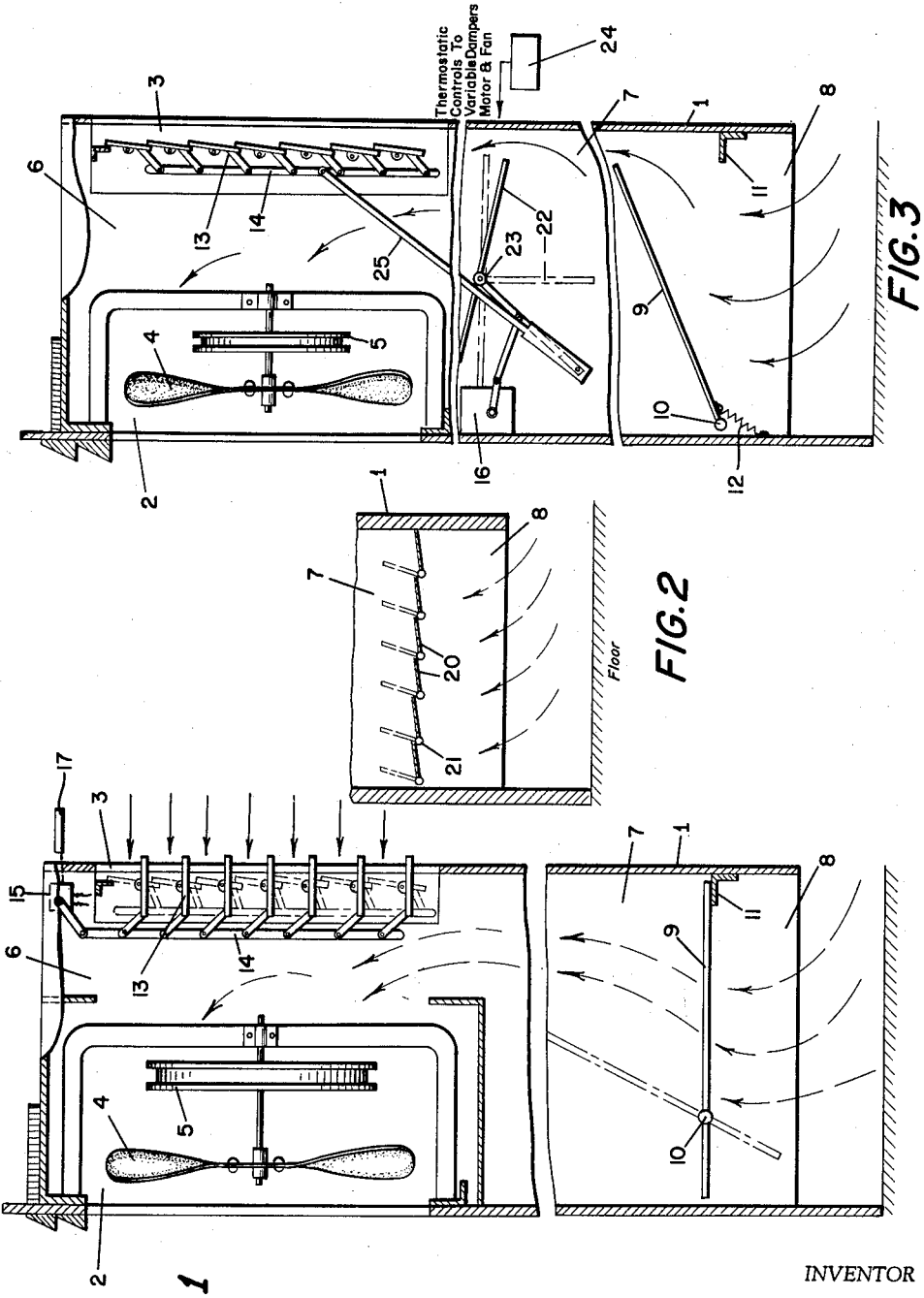
INVENTOR
ROBERT W. MIECZKOWSKI
BY J. Howard Flint
ATTORNEY

United States Patent Office 3,188,937
Patented June 15, 1965

3,188,937
AIR CONTROL APPARATUS
Robert W. Mieczkowski, Tunkhannock,
Wyoming County, Pa.
Filed Mar. 13, 1963, Ser. No. 264,930
4 Claims. (Cl. 98—43)

Ventilation of simple barns leaves much to be desired. Regulation of the atmosphere in barns that house animals encounters rather severe limits. Changes of moisture and temperature must stay within bounds. Apparatus for control must be simple and inexpensive. For example, low margin business like poultry or cattle may require many animal units in a single building. Heat and moisture build up so the air must be renewed. Yet costs of ventilation must be kept low. Ventilating apparatus must be substantially automatic because labor is costly and cannot be devoted to regulating a machine. Yet limits of humidity and temperature in the animal area are narrow, else the animals suffer from dampness or from too hot or too cold surroundings. Hence the ventilating apparatus must be dependable as well as self-operating. To accomplish this within low limits of cost and simplicity is difficult.

This invention is for improvements in machines to ventilate barns that require moisture and temperature to be within fairly narrow limits, as in a cow barn or a poultry house. This invention presents a novel combination of parts for automatic ventilating with self-operating adjustment to various conditions of air, particularly at the floor level. Particularly this invention is to simplify in the extreme the arrangement and mode of operation of the ventilator. The invention is to lower costs and to save labor, yet obtain improved functioning of the barn ventilator. Other objects and advantages of this invention will appear from the following description of illustrative examples.

This invention is a combination of means for controlled ventilation of a floor area in automatic correlation to air conditions in warmer parts of a barn. The same combination will also ventilate those warmer areas if need be. In effect this is a remote control of the floor air. Yet it utilizes only a minimum of control instruments; for example, using but one thermostat.

Advantages of this invention appear in combining in a ventilator an air removal conduit for upright location in a barn, an opening at the top and an air eductor fan connected thereto, a window to supply inlet air to the fan located near the fan, control means to open and to close the window, a freely mounted or one way damper in the bottom of the conduit, and an air inlet opening below the damper, whereby an open or closed condition of the window controls operation of the bottom damper. With the air inlet near the floor, floor ventilation is responsive to pressure at the inlet according to an open or closed condition of the upper window. With a thermostatic control for the window responsive to warmer levels in the barn, floor ventilation is in self-adjusting correlation to such remote upper levels. Opening the window directly to the nearby fan impedes and stops the floor ventilation by closing the damper that opens and closes the bottom air inlet.

The following description refers to the accompanying drawings of specific illustrative forms of this invention, while the appended claims define novel features of the invention.

In the drawings:

FIG. 1 is a vertical section through a combination ventilator, mounted upright against a barn wall, comprising an air conduit with automatic floor control;

FIG. 2 is a partial section of an alternative embodiment showing in combination a portion of a riser conduit and gang form of floor inlet closure;

FIG. 3 is a modification in which between an upper window and a floor inlet closure of the combination is mounted means to modify the floor inlet control when that inlet is open.

Referring to the drawings:

The ventilator, which may be installed as a unit, comprises an open-bottom elongate box 1, herein termed a conduit for air flow. Its upper part contains opening 2 at one side to be placed at a comparable opening in the side of a barn or poultry house or the like. The upper part contains also an opening 3, which may be termed a window or upper air inlet opening, to the inside of the barn. This usually is opposite opening 2. Between opening 2 and window 3 is mounted an eduction fan 4 having driving means, such as belt pulley 5. Openings 2 and 3 and fan 4 are similar to each other in air flow capacity. Fan 4 is arranged to move air out through outer opening 2. The fan 4 is placed near window 3 so as to obtain large and quick intake of air at the top of conduit 1, from window 3. This entire upper portion of the ventilator may sometimes be termed herein a cross-conduit or cross-ventilator and be designed generally by numeral 6.

Cross conduit 6 is quite short relatively to the rising leg 7 of air conduit 1 and, taking each as a whole, presents appreciably lesser restriction or resistance to air flow. Details of various specific forms and arrangements will become apparent from this description to those skilled in the art. When the cross-conduit 6 is open, substantially all the air flow is through window 3 to fan 4 and out as compared with any minor flow through riser conduit 7.

The bottom of conduit 1 is placed only slightly above the floor level of the barn and communicates therewith by air inlet opening 8. Slightly above opening 8 a conduit closure or damper 9 is freely mounted to swing up and back on a cross-axle 10. When horizontal, or in down position, flap or damper 9 closes conduit 1 and when swung up opens conduit 7 to some predetermined degree. The front edge of damper 9 is kept from swinging below closed position, as for example by edge contact with the front face of riser 7 or with a stop 11 thereon. The damper 9 is arranged with any suitable mounting so as to be biased down to closed position. For example, FIG. 1 shows damper 9 in an off-center position on axle 10 so as to close by gravity; while FIG. 3 shows a full swing about axle 10 at one end of damper 9 and with an optional down-bias spring 12 mounted below the axle to augment the closing effect of gravity. This latter form is useful particularly when damper 9 is of light weight. Damper 9, however, is sufficiently rigid to withstand repeated upward pulls of air and the stresses of falling to closed position. Damper 9 is sufficiently light and balanced as to swing up and open under pressure of upward air flow from floor inlet 8. The balance or state of upward air pressure at the lower part of riser conduit 7 determines whether damper 9 opens or closes floor inlet 8. Damper 9 is constructed to operate with as much or as little drag or sluggishness as may be selected at given pressures.

Inner window 3 at the upper end of the ventilator is arranged to open and to close. Automatic means for this purpose of themselves are known to those skilled in the art. In the drawings this window is shown with a gang of cross louvers or slats 13 individually mounted on cross axles and loosely pinned to a common evener or vertical connecting rod 14. Rod 14 is moved by suitable connection with a source of power as, for example, thermostatically controlled motor 15 or 16 illustrated diagrammatically in FIGS. 1 and 3.

On FIG. 1, control of window 3 is by connection of shutter rod 14 with a conventional damper motor 15, responsive to thermostatic sensing element 17 near a selected upper part of the barn. Such control means are well-known of themselves and do not require further description to those skilled in the art. These elements are arranged to keep window 3 closed unless the selected upper sensing space becomes unduly warm; then they serve to throw window 3 open so that warm air flows directly in volume through window 3, cross conduit 6 and fan 4 to discharge from outlet opening 2. It may be noted that the inflow of air through window 3 becomes large even in the early stages of opening shutters 13, increasing relatively less with further opening of the window. In other words, at the commencement of cross-flow of air in cross-conduit 6 the pressure of this cross current increases at once. At the same time the flow or pressure of air up through vertical leg 7 of the ventilator diminishes correspondingly. In consequence, the damper 9 at the floor inlet 8 drops at once to close that inlet. Ventilation thus shifts rather abruptly from the floor area to upper, warm levels when those upper levels need ventilating. Contrary to this, when need to ventilate those upper levels has been served, ventilation returns automatically to the floor area by closing of window 3. This closing effects the re-opening of damper 9 by restoring air flow or pressure at the bottom of riser conduit 7. It will be noted that effectively damper 9 and window 3 are interconnected by lost-motion means in the yielding air column in riser conduit 7. This leads to smooth control of the bottom inlet, as described.

It will be noted that, as shown in the drawings, preference is for both window 3 and damper 9 to be biased shut. This prevents back flow of air when fan 4 is stopped. In winter weather this is especially important. Otherwise cold air from outside the barn condenses moisture on the floor and even freezes at the floor surface. This has been cumulative, for warm air in the barn carrying more moisture has continued to cool and descend to the floor level.

Fan 4 preferably is a constant speed fan, for the fact that this suffices becomes one of the advantages of this invention. Fan 4 may be started or stopped by any suitable arrangement, not shown, and pulley wheel 5 may be driven by motor suitably placed but not deemed necessary to show to those skilled in the art, or may be direct-connected to a motor.

Attention may be directed to the modification of floor inlet damper shown in FIG. 2. Here in lieu of a plate damper 9 is a series of individual shutters 20 mounted on individual cross axles 21. These are arranged to lie tight against each other when closed, so that each acts as a stop for its neighbor but as a whole serve to close air inlet 8. An advantage of this form of damper is that each individual shutter 20 is relatively light and so lifts easily with even low air pressure and in accordance with variation, if any, in the pressure across the bottom of riser 7. Indeed these shutters 20 may differ in weight or in ease of lifting, one from the other, if desired, so as to present a chosen pattern of opening of the damper. That is, damper 9 as a whole is a multiple of individually mounted and individually biased shutters 20.

In FIG. 3 will be noted means interposed between floor damper 9 and upper window 3 so as to vary the effective floor inlet pressure when damper 9 (or 20) is open. This means comprises a cross shutter 22 rotatable about shaft 23 or otherwise movable to partially close or open riser conduit 7. This action is shown associated with a drive from a motor 16 responsive to one or more thermostatic controls from the barn area, indicated in conventional form. This modifying means is adapted to stop the shutter 22 at desired positions more or less blocking riser conduit 7 according to the thermostatic control. Description of one suitable form of this modifier element is found in U.S. Patent 2,750,- 868 or corresponding Canadian Patent 578,476 to Mieczkowski, to which further reference is made.

The shutter 22 is connected to lost-motion means with window 3. When window 3 is open, shutter 22 is in its most nearly closed position. When shutter 22 is in any open position, window 3 is closed. Suitable connection is illustrated by slotted arm 25, but more broadly this is an element essentially to introduce resiliency or yielding in this relationship between shutter 22 and window 3 so as to minimize hunting of damper 9 or effects from intermediate pressure variations at the floor inlet or damper 9 or the condition of window 3. As stated in effect, when window 3 is open, damper 9 is closed. there being yielding or lost-motion connection between the two at least part of which is the yielding cushion of air in riser conduit 7 above damper 9 (or 20).

Action of the combination shown in in FIG. 3, with window 3 closed, is for fan 4 to cause upward pressure at floor inlet 8 to lift inlet damper 9 (or 20). This over-all regulation to open (or to close) inlet 8 serves as remote, but simple, control of floor ventilation. During removal of floor air through bottom inlet 8, the rate of removal may be modified by the interposed shutter 22. When shutter 22 is placed in partially open position, as shown in FIG. 3, by action of its thermostatic controls 24, the upflow of air in riser conduit 7 is partially throttled. Ventilation, or air removal, from the barn floor is at some desired low rate. This might well be desired when, for example, outside air is very cold and should not be brought into the barn as replacement, but yet the barn floor requires some ventilating. The particular relative positions of inlet damper 9 and modifier shutter 20 will vary according to choice of their respective size and weight and arrangement, as those skilled in the art will understand. The ultimate object of this throttling is controlled low rate of floor ventilation. At more open positions of shutter 22, such as indicated by dotted lines in FIG. 3, the opening of inlet damper 9 and the passage of floor air to fan 4 will approach the capacity of the ventilator. Usually it will be desired that this floor air removal is at a more limited capacity than the direct or more demanding removal of warm air from upper levels of the barn. This can be arranged by the nature of inlet 8, having in mind the resistances to air flow by the relative length of riser 7 and by the damper 9 (or 20) as well as the combination comprising modifier shutter 22.

In this description and claims it will be understood that the term barn is used to include also stables, pens, housing or similar structures to be ventilated, whether specifically used for cattle or poultry or otherwise. Also, it will be understood that since moisture in the barn air is affected by the ventilation as well as temperature is affected, control instruments responsive to moisture may be comprehended in or equivalent to the term thermostat, though this latter term usually means a temperature-responsive instrument.

This specification in compliance with the patent statutes described this invention and the manner and process of making and using it in full, clear, concise and exact terms so as to enable any person skilled in the art to make and use the invention, using examples illustrating the best mode now contemplated therefor. Those skilled in the art will now be enabled to apply equivalent elements and modifications of this invention, within the appended claims.

What is claimed is:

1. A ventilator comprising a conduit adapted to be mounted upright, having at its lower end an air-inlet opening to be spaced above a floor, the conduit having an air outlet opening near its top adapted to connect with an opening in a building wall, and an air eductor fan connected to said air outlet opening, and to supply inlet air to the fan directly, a second upper opening in the conduit wall near the fan, providing less resistance to air travel to the fan from said upper air inlet opening than from said lower opening, control means to open and to close the said upper air inlet opening near the fan, one-way damper means in the conduit below the upper air inlet and above said lower end opening constructed to be held open by air drawn to the fan from said lower opening, the damper being biased to close under relatively diminished air flow through the lower conduit opening when air supply is drawn directly to the fan from said upper air inlet opening near the fan, whereby an open or a closed condition of the said upper air inlet controls operation of the biased one-way damper means and of air flow through the lower end of the conduit.

2. A ventilator as defined in claim 1, whereby the one-way damper means in the conduit below the upper air inlet opening comprises a plurality of louvers individually mounted and separately adapted to be held open by air drawn to the fan from the air inlet opening at the bottom of the conduit and separately biased to close under the stated diminished air flow in the conduit when air is drawn directly to the fan from the upper side inlet.

3. A ventilator as defined in claim 1, wherein there is mounted in the conduit between the bottom air inlet opening and the upper air inlet opening means opening and closing the conduit to modify pressure of air moving upward in the conduit against the biased one-way damper from the bottom air inlet opening, the said pressure-modifying means being connected to the upper air inlet control means and opened and closed thereby as the said control means opens and closes the upper air inlet.

4. A ventilator as claimed in claim 1 having an upper portion of the said conduit between the upper air inlet opening and the eductor fan, and having the lower part of said conduit containing said damper extending down from said upper portion to a bottom floor air inlet opening into the conduit, the said upper air inlet opening and the said upper portion of the conduit to the fan being relatively shorter and being less resistant to air flow than the said lower inlet air opening and the said lower part of the conduit to the fan.

References Cited by the Examiner
UNITED STATES PATENTS

| | | | |
|---|---|---|---|
| 2,552,966 | 5/51 | Harp | 98—110 |
| 2,633,071 | 3/53 | Erickson | 98—116 X |
| 2,750,868 | 6/56 | Mieczkowski | 98—116 |

ROBERT A. O'LEARY, *Primary Examiner.*